United States Patent
Lenard et al.

(10) Patent No.: US 7,033,254 B2
(45) Date of Patent: Apr. 25, 2006

(54) GRINDING MACHINE FOR DOUBLE-SIDED GRINDING OF SAW TOOTH EDGES

(75) Inventors: Peter Lenard, Biberach (DE); Ernst Beck, Biberach (DE)

(73) Assignee: Vollmer Werke Maschinenfabrik GmbH, Biberach/Riss (DE)

( * ) Notice: Subject to any disclaimer, the term of this patent is extended or adjusted under 35 U.S.C. 154(b) by 140 days.

(21) Appl. No.: 10/477,675

(22) PCT Filed: May 14, 2002

(86) PCT No.: PCT/EP02/05303
§ 371 (c)(1),
(2), (4) Date: Nov. 12, 2003

(87) PCT Pub. No.: WO02/092270
PCT Pub. Date: Nov. 21, 2002

(65) Prior Publication Data
US 2004/0185749 A1 Sep. 23, 2004

(30) Foreign Application Priority Data
May 17, 2001 (DE) .......................... 101 24 203

(51) Int. Cl.
*B24B 49/00* (2006.01)
*B23D 63/12* (2006.01)

(52) U.S. Cl. .............................. 451/57; 451/198; 76/43
(58) Field of Classification Search ................. 451/198, 451/193, 57, 48; 76/43, 37, 48, 50, 41, 42
See application file for complete search history.

(56) References Cited

U.S. PATENT DOCUMENTS

| 810,610 | A | * | 1/1906 | Bishop ........................... 76/50 |
| 4,848,205 | A | * | 7/1989 | Suzuki et al. .................. 83/853 |
| 6,109,137 | A | * | 8/2000 | Lenard et al. ................... 76/37 |
| 6,332,375 | B1 | * | 12/2001 | Randl et al. .................... 76/43 |

FOREIGN PATENT DOCUMENTS

| DE | 42 44 180 A 1 | | 6/1994 |
| DE | 19855773 | * | 6/2000 |
| DE | 198 55 773 A 1 | | 6/2000 |
| DE | 19920101 | * | 11/2000 |
| DE | 199 20 101 A 1 | | 11/2000 |

* cited by examiner

*Primary Examiner*—Robert A. Rose
(74) *Attorney, Agent, or Firm*—Richard W. James; Eric D. Ruka

(57) ABSTRACT

A grinding machine (10) for double-sided grinding of tooth flanks, in particular hard-metal tipped circular saw blades (14) is described. The grinding machine comprises two grinding units (16, 18) each with a grinding body, a first drive to move at least one of the two grinding units (16, 18) along a first axis ($x_1$, $x_2$) running perpendicular to a plane containing the saw blade (14) and also a second drive (36) to move at least one of the two grinding units (16, 18) along a second axis (z) running parallel to axes of rotation of the grinding bodies. Furthermore a third drive (38) is provided to move at least one of the two grinding units (16, 18) along a third axis (y) running parallel to the first ($x_1$, $x_2$) and the second (y) axis. A control method according to the invention for the grinding machine (10) provides that a tangential clearance angle of a tooth is varied along a tooth flank during the grinding of the tooth.

13 Claims, 6 Drawing Sheets

GRINDING MACHINE FOR DOUBLE-SIDED GRINDING OF SAW TOOTH EDGES

The invention relates to a grinding machine for double-sided grinding of saw tooth edges, in particular hard-metal tipped circular saw blades, with two grinding units, each with a grinding body, a first drive to move at least one of the two grinding units along a first axis running perpendicular to a plane containing the saw blade and a second drive to move at least one of the two grinding units along a second axis running parallel to axes of rotation of the grinding bodies.

A grinding machine of this kind is known from DE 42 44 180. In the known grinding machine two cradles are provided in each case for each of the two grinding units. By means of the two cradles each grinding unit can be moved along two axes running perpendicular to one another. The first of these two axes runs parallel to the plane in which the saw blade is arranged (saw blade plane). A first drive permits the two grinding units to be moved towards one another along the first axis for machining the saw blade. A second drive enables the two grinding units to be advanced along the second axis.

In the known grinding machine a tangential clearance angle, enclosed by the tooth flanks with the saw blade plane, can be rigidly set by suitable choice of the diameter of the grinding body and by inclining the axes of rotation of the grinding bodies in respect of the advance direction defining the second axis at the beginning of the grinding process.

The object of the invention is to make available a grinding machine which has an extended functionality and also to cite a suitable control method for this grinding machine.

Starting from a grinding machine with the initially mentioned features, in the grinding machine according to the invention there is additionally a third drive to move one of the two grinding units or both grinding units along a third axis running perpendicular to the first and the second axis. A grinding machine configured in this way can be controlled by means of the control method according to the invention in such a way that during grinding of a tooth the tangential clearance angle of a tooth flank is varied along the second axis, i.e. along the tooth flank. The tooth flanks can be profiled by variation of the tangential clearance angle. The grinding machine configured according to the invention consequently makes available a further degree of freedom in respect of machining the tooth flanks.

Variation of the tangential clearance angle along the tooth flanks may takes place by means of path-controlled grinding along the second and the third axis. For this purpose a joint control unit can be provided for at least the second and third drives. This control unit enables coordinated, coupled movement of the grinding bodies simultaneously along the second and third axes. The tangential clearance angle is in this case varied in that the offset of a grinding body along the third axis is chosen of varying size for different points on the tooth flank along the second axis.

The two grinding units are advantageously arranged on a joint carrier in the shape, for example, of a bench which can be movable along the third axis by means of the third drive. With a configuration of this kind of the grinding machine according to the invention the two grinding units can be moved synchronously along the third axis by means of a single drive. However, it is also conceivable to provide a separate drive for each of the two grinding units, in order to move the two grinding units perpendicular to the first and the second axis independently of one another.

In the case where the two grinding units are arranged on a joint carrier, the carrier can be configured as additionally movable along the second axis by means of the second drive. The two grinding units can then be moved synchronously parallel to the axes of rotation of the grinding bodies, i.e. in and against the advance direction. However, if the two grinding units are to be movable along the second axis independently of one another, a separate drive can also be provided for each of the two grinding units.

According to one embodiment there is a fourth drive which likewise permits one of the two grinding units to be moved perpendicular to the saw blade plane. By means of the first and fourth drives the two grinding units can then be moved along an axis running perpendicular to the saw blade plane in each case independently of one another.

At least the third drive may comprises a servomotor. The other drives can also be equipped with a servomotor.

Further details and advantages of the invention emerge from the following description of a preferred embodiment example and from the figures.

Figure 1:
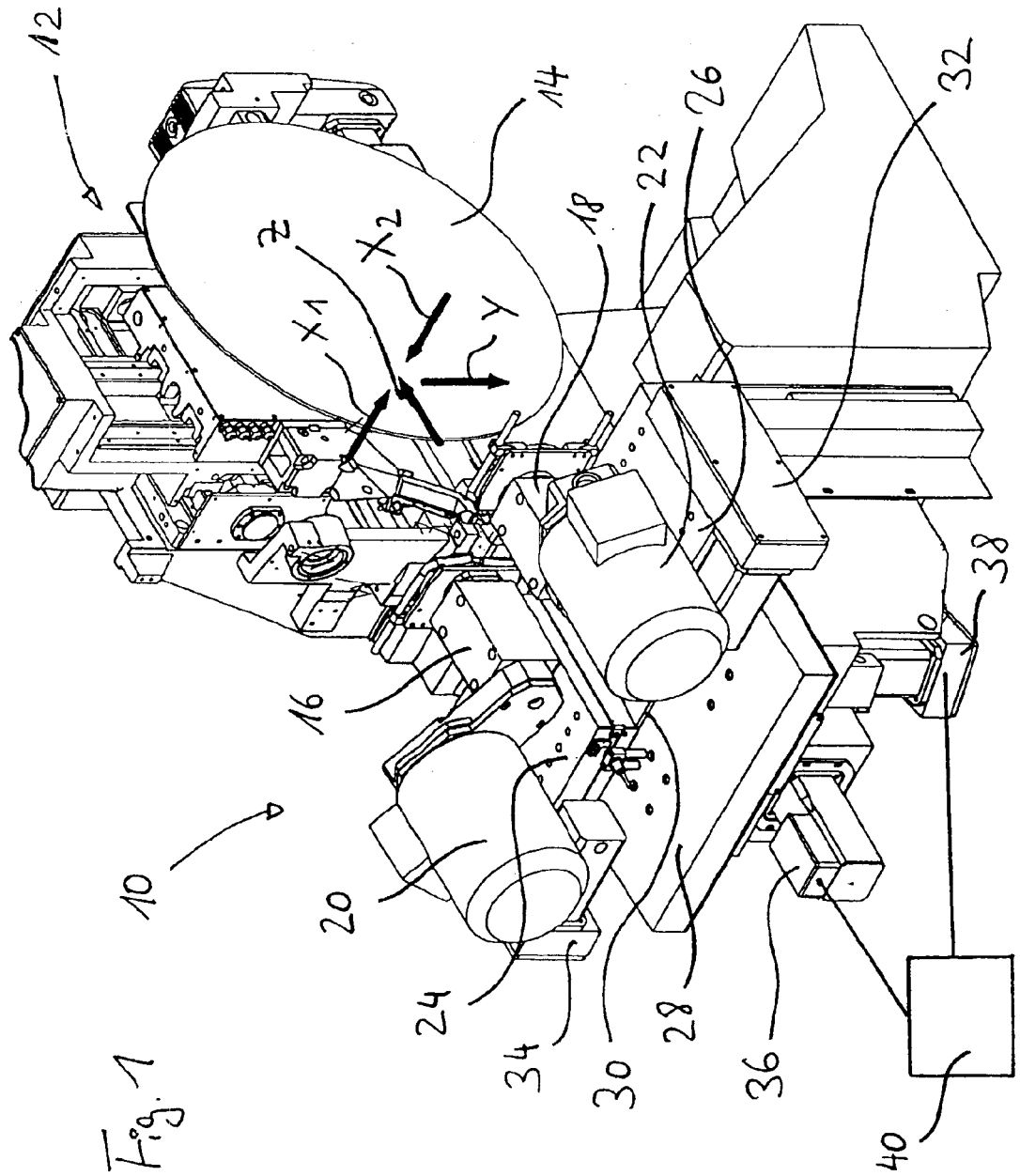
FIG. 1 shows a first perspective view of a grinding machine according to the invention.

In FIG. 1 a perspective view of an embodiment of the grinding machine 10 according to the invention and a positioning device 12 for a saw blade 14 is illustrated. The positioning device 12 permits positioning of the saw blade in respect of the grinding machine 10 irrespective of the diameter of the saw blade.

The grinding machine 10 comprises two grinding units 16, 18, each with a grinding body, concealed in FIG. 1, in the form of a grinding disc. To each grinding unit 16, 18 is allocated in each case a drive motor 20, 22 for the grinding body.

Each of the two grinding units 16, 18 is arranged with the associated drive motor 20, 22 on a separate cradle 24, 26. The grinding machine 10 comprises a bench-like carrier 28, provided with a guide 30 for the two cradles 24, 26. The guide 30 is constructed in such a way that the two cradles 24, 26 together with the grinding units 16, 18 arranged thereon are displaceable and guided perpendicular to the plane in which the saw blade 14 is arranged.

For each of the two cradles 24, 26 a drive 32, 34 is provided in each case. By means of the two drives 32, 34 the two grinding units 16, 18 can be moved along the guide 30. The first grinding unit 16 can be moved by its allocated drive 34 along a first axis running perpendicular to the saw blade plane and indicated by arrow $x_1$. The second grinding unit 18 can be moved by means of its allocated drive 32 along an axis coaxial to axis $X_1$ and indicated by arrow $x_2$.

A separate drive 36 is provided for the carrier 28. Drive 36 serves to advance the grinding units 16, 18. By means of drive 36 the carrier 28 and the grinding units 16, 18 arranged on the carrier can be displaced parallel to the axes of rotation of the grinding bodies. Drive 36 therefore serves for joint movement of the grinding units 16, 18 along an axis indicated by arrow z (advance direction) and running parallel to the axes of rotation of the grinding bodies.

The carrier 28 is coupled to a further drive 38 which enables the carrier 28 to be moved both perpendicular to the z axis and perpendicular to the two x axes. The movement of the grinding units 16, 18 induced by drive 38 is indicated by arrow y. Arrow y consequently indicates the axis along which the two grinding units 16, 18 can be moved by means of drive 38.

The grinding machine 10 further comprises a schematically illustrated control unit 40, which permits joint activation of drive 36 for a movement along the z axis and of drive 38 for a movement along the y axis. Although not drawn in FIG. 1, the control unit 40 also controls drives 32, 34 for the grinding units 16, 18.

Figure 2:
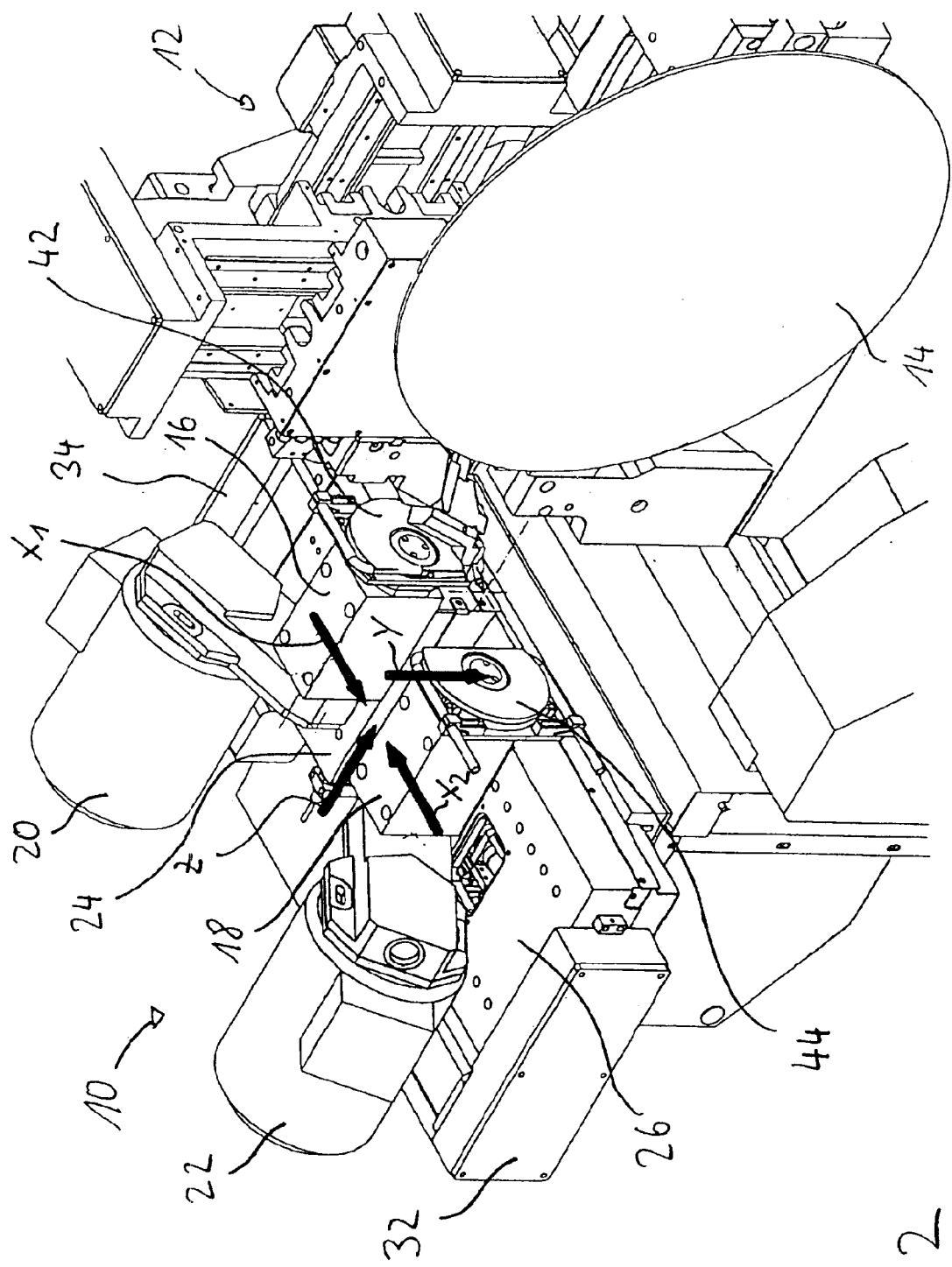
FIG. 2 shows a second perspective view of the grinding machine illustrated in FIG. 1.

In FIG. 2 the grinding machine 10 illustrated in FIG. 1 is reproduced from a different perspective. The disc-shaped first grinding body 42 allocated to the first grinding unit 16 and the likewise disc-shaped second grinding body 44 of the second grinding unit 18 can be seen.

Figure 3:
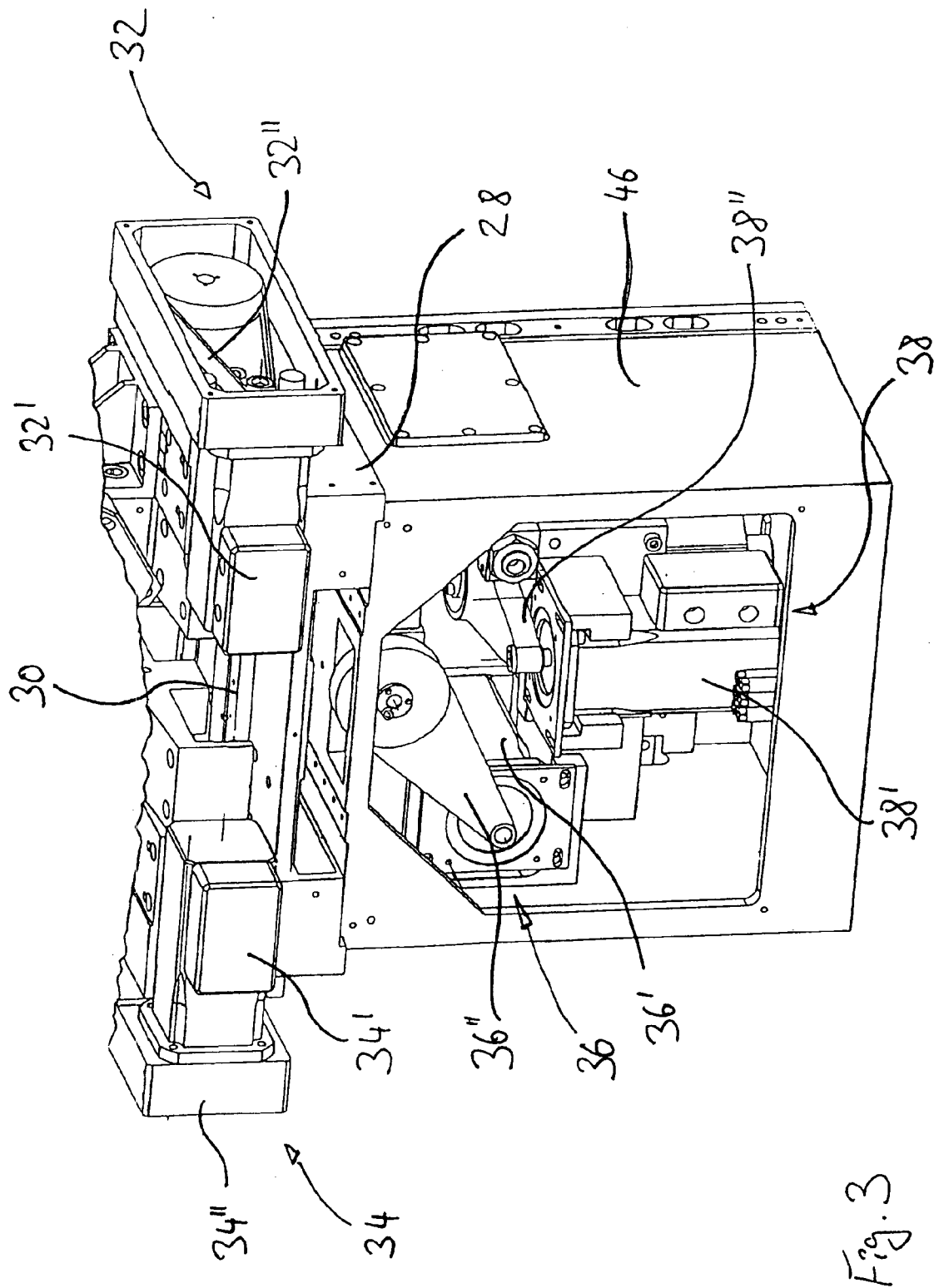
FIG. 3 shows the drives of the grinding unit according to the invention.

FIG. 3 shows possible configurations of the drives 32, 34, 36, 38 illustrated in FIGS. 1 and 2. Each of the drives 32, 34, 36, 38 comprises a servomotor 32', 34', 36', 38' which is coupled via a belt 32", 34", 36", 38" in each case to a ball screw, not designated in FIG. 3. In the grinding machine 10 illustrated in FIG. 3 the substructure 46 of the carrier 28 is constructed as very slightly different from that in the grinding machine according to FIGS. 1 and 2. However, this does not result in any functional changes.

Figure 4:
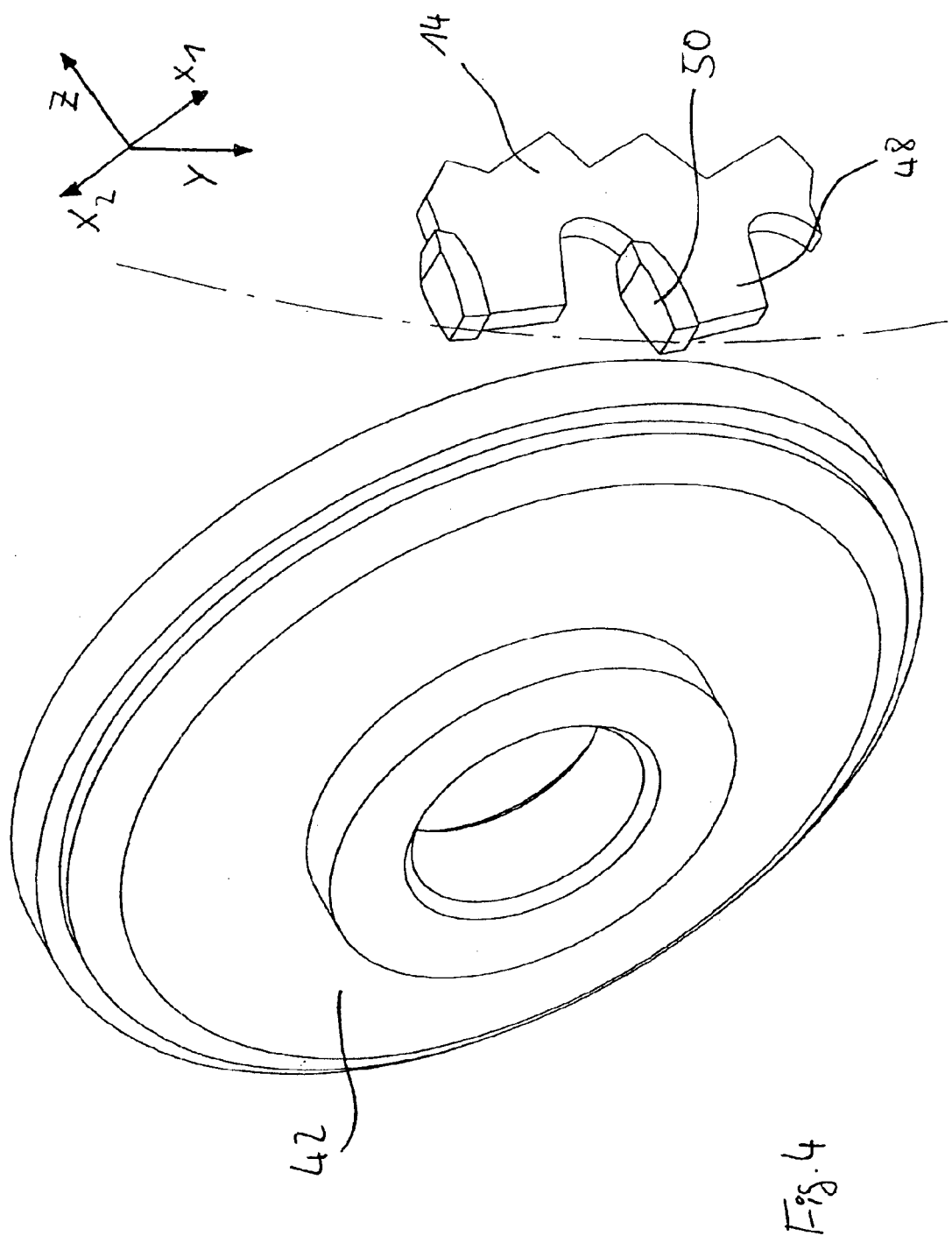
FIG. 4 shows the contact of a disc-shaped grinding body with a saw blade.

In FIG. 4 the contact of the disc-shaped grinding body 42 illustrated in FIG. 2 with the saw blade 14, more precisely with the hard-metal edging 50 of a saw blade tooth 48, is sketched schematically.

Figure 5:
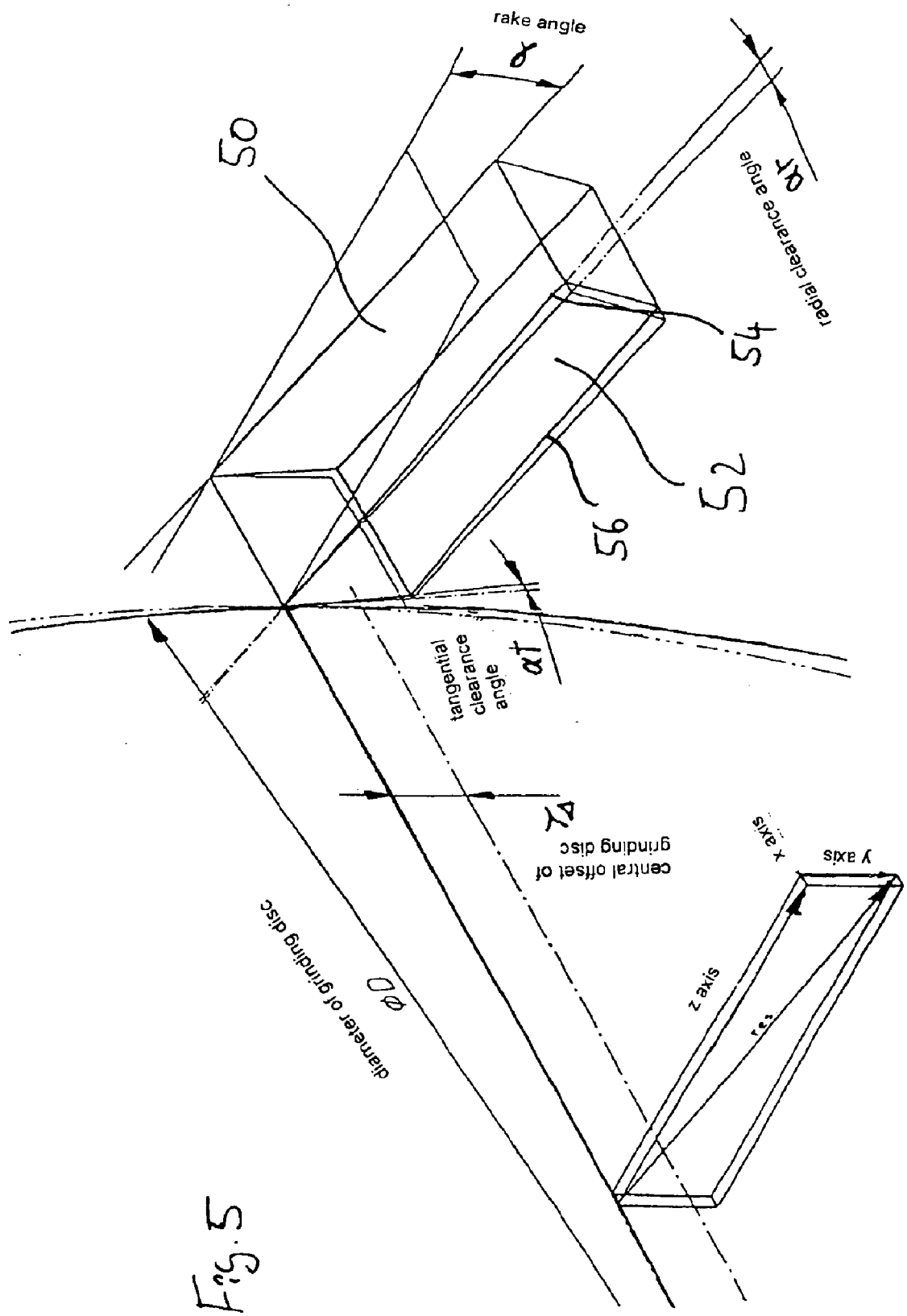
FIG. 5 shows the relevant angles for the grinding of a saw blade.

FIG. 5 shows the angles relevant during grinding of the hard metal edging 50, namely the rake angle a, the radial clearance angle $a_r$ and the tangential clearance angle $a_t$. By suitable control of the individual drives of the grinding machine any number of rake angles a, radial clearance angles $a_r$ and tangential clearance angles $a_t$ can be programmed and automatically ground, so manual setting can be dispensed with. The reason for this is above all the provision of the additional drive for moving the grinding units along the y axis. The subject of the following observation is principally the construction of a tangential clearance angle $a_t$ varying in the z direction. However, the rake angle a and the radial clearance angle $a_r$ can be program-controlled in a similar way.

The tangential clearance angle $a_t$ of a tooth flank 52 at a specific location along the z axis is a function of the position of the upper longitudinal edge 54 of the tooth flank 52 relative to the position of the lower longitudinal edge 56. If at a specific point on the z axis the tangent connecting opposite points of the two longitudinal edges 54, 56 runs parallel to the saw blade plane, the tangential clearance angle $a_t$ is 0°. If on the other hand the tangent runs diagonally to the saw blade plane, the tangential clearance angle $a_t$ is larger or smaller than 0°, depending on the position of the tangent.

The tangential clearance angle $a_t$ being set during grinding is a function of the relative position of the contact point of the grinding disc with the tooth flank 52 along the y axis. This means that the size of the tangential clearance angle $a_t$ can be influenced by means of an offset Δy of the grinding disc relative to the tooth flank 52 along the y axis.

If during the grinding process in the course of a relative movement between the grinding body and the hard-metal edging to be machined along the z axis the position of the grinding disc is changed along the y axis, the position of the contact point of the grinding disc along the y axis with the flank 52 to be machined, i.e. the tangential clearance angle $a_t$, changes simultaneously. The tangential clearance angle profile of the tooth flank 52 can therefore be specifically influenced by means of suitable control of the movement of the grinding body along the z axis and the y axis.

Figure 6:
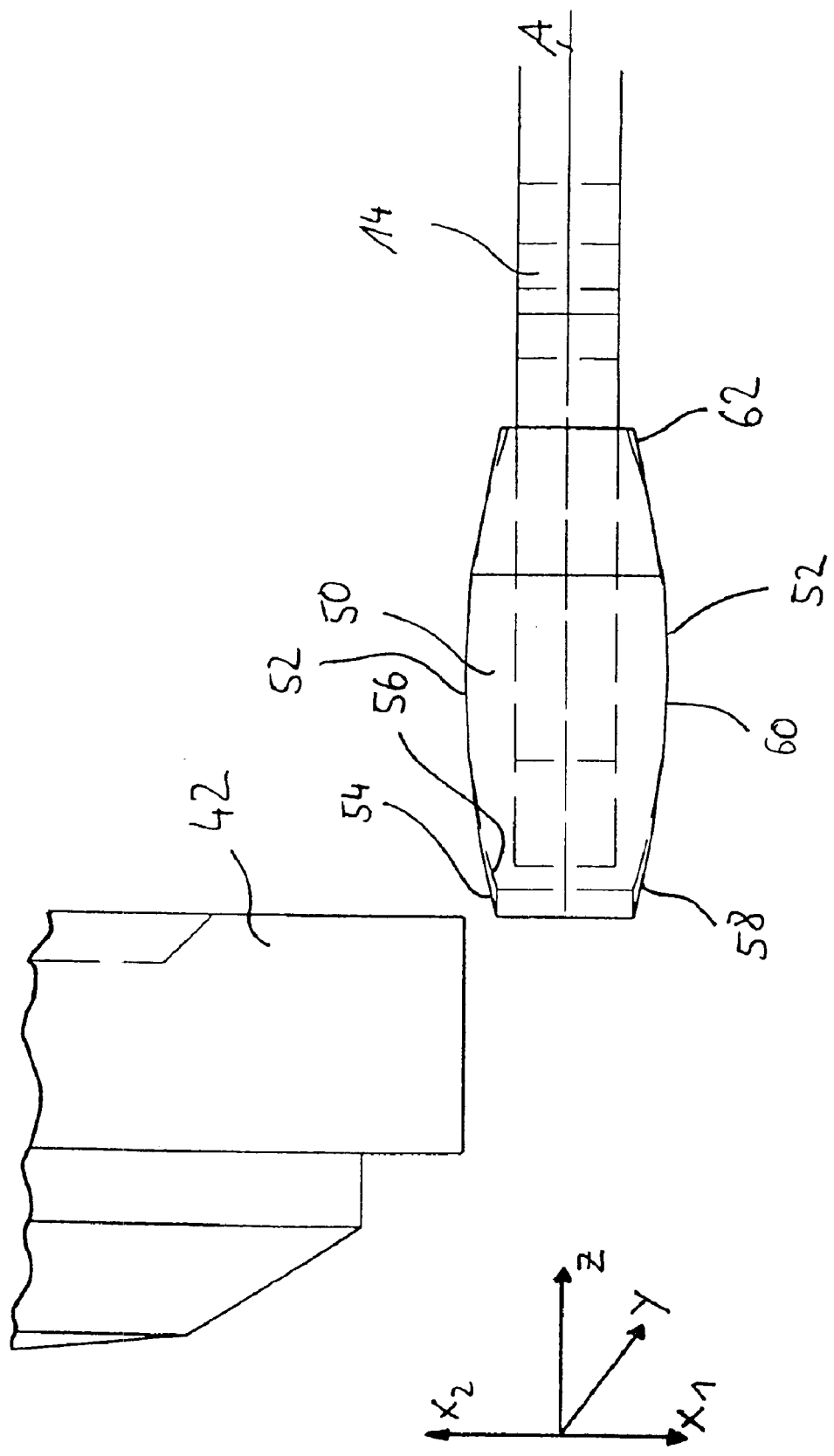
FIG. 6 shows a saw blade ground with the grinding machine illustrated in FIGS. 1 to 3 according to the grinding method according to the invention.

In FIG. 6 the hard metal edging 50 is illustrated schematically after completion of a grinding process. The tooth flanks 52 of the hard-metal edging 50 have been ground as crowned.

The upper longitudinal edge 54 of the tooth flank 52 is drawn as a solid line and the lower longitudinal edge 56 as a dotted line. In the horizontal projection on to the hard-metal edging 50 according to FIG. 6 it can clearly be seen that in a central area 60 of the hard-metal edging 50 along the z axis, i.e. in the area 60 of maximum bulging, the tangent connecting opposite points of the side edges 54, 56 to one another runs parallel to the saw blade plane. The tangential clearance angle $a_t$ is therefore exactly 0° in this area 60.

If a movement is now made starting from point 60 along the z axis to the left or to the right, the lower longitudinal edge 56 is increasingly offset in respect of the upper longitudinal edge 54 in the direction of the longitudinal axis A of the hard-metal edging 50. This means that the tangential clearance angle $a_t$ starting from point 60 gradually increases in amount in both directions along the z axis. A variation of this kind of the tangential clearance angle $a_t$ along the tooth flank 52 is derived from the interaction of drive 36, illustrated in FIG. 1, with drive 38.

The profiling of the tooth flanks 52 in respect of the tangential clearance angle $a_t$ can be programmed and ground in any way. As illustrated in FIG. 6, the tangential clearance angle $a_t$ can be chosen as minimal in amount in the centre 60 of the tooth flank 52 (e.g. $a_t=0°$). In the direction of areas 58, 62 of the tooth flank 52 located diametrically opposite one another in respect of the centre 60 the tangential clearance angle $a_t$ can increase in amount constantly. In the end areas 58, 62 of the hard-metal edging 50 the tangential clearance angle $a_t$ may be positive and greatest in amount. It may then be, e.g., in the range of $+1° \leq a_t \geq +3°$.

What is claimed is:

1. A grinding machine for double-sided grinding of a tooth flank on a hard-metal tipped circular saw blade, comprising:
    two grinding units, each with a grinding body;
    a first drive to move at least one of the two grinding units along a first axis running perpendicular to a plane contaiting the saw blade;
    a second drive to move at least one of the two grinding units along a second axis running parallel to axes of rotation of the grinding bodies;
    a third drive to move at least one of the two grinding units along a third axis running perpendicular to the first and the second axes; and
    a joint control unit for coordinating the movements of the grinding units along the second and the third axes in such a way that during grinding of a tooth a tangential clearance angle of the tooth flank is variable along the second axis.

2. The grinding machine of claim 1, wherein the two grinding units are arranged on a joint carrier which is movable along the third axis by means of the third drive.

3. The grinding machine of claim 2, wherein the carrier is additionally movable along the second axis by means of the third drive.

4. The grinding machine of claim 1, further comprising a fourth drive and wherein the two grinding units are movable along the first axis and second axis parallel to the first axis independently of one another by means of the first and fourth drives.

5. The grinding machine of claim 1, wherein at least the third drive comprises a servomotor.

6. A method for controlling a grinding machine having two grinding units, each grinding unit having a grinding body and each grinding body having an axis of rotation, comprising:

moving at least one of the two grinding units along a first axis running perpendicular to a plane for containing a saw blade, the saw blade having a tooth and the tooth having a flank;

moving at least one of the two grinding units along a second axis running parallel to at least one of the axes of rotation of the grinding bodies;

moving at least one of the two grinding units along a third axis running perpendicular to the first and the second axes; and coordinating the movements of the two grinding units along the second and the third axes in such a way that during grinding of the tooth, a tangential clearance angle of the tooth flank is variable along the second axis.

7. The method for controlling a grinding machine of claim 6, wherein during the grinding of the tooth a tangential clearance angle of the tooth flank is varied along the tooth flank.

8. The method of claim 7, wherein the tangential clearance angle is varied by simultaneously moving at least one of the two grinding units along the second axis and moving at least one of the two grinding units along the third axis.

9. The method of claim 7, further comprising choosing the tangential clearance angle as minimal in amount approximately in the centre of the tooth flank.

10. The method of claim 7, further comprising choosing the tangential clearance angle as constantly increasing in areas of the tooth flank located diametrically opposite one another in respect of the centre with increasing distance from the centre.

11. A method for controlling a grinding machine having two grinding units, each grinding unit having a grinding body and each grinding body having an axis of rotation, comprising:

moving at least one of the two grinding units along a first axis running perpendicular to a plane for containing a saw blade, the saw blade having a tooth and the tooth having a flank;

moving at least one of the two grinding units along a second axis running parallel to at least one of the axes of rotation of the grinding bodies;

moving at least one of the two grinding units along a third axis running perpendicular to the first and the second axes; and varying a tangential clearance angle along the tooth flank of the saw blade in such a way that the offset of one of the grinding bodies along the third axis is of varying size for different points on the tooth flank along the second axis.

12. The method of claim 6, wherein the axis of rotation of the first grinding body is parallel to the axis of rotation of the second grinding body.

13. A method for controlling a grinding machine having a grinding unit, the grinding unit having a grinding body and the grinding body having an axis of rotation, comprising:

moving the grinding unit along a first axis running perpendicular to a plane for containing a saw blade, the saw blade having a tooth and the tooth having a flank;

moving the grinding unit along a second axis running parallel to at least one of the axes of rotation of the grinding body;

moving the grinding unit along a third axis running perpendicular to the first and the second axes; and coordinating the movement of the grinding unit along the second and the third axes in such a way that during grinding of the tooth, a tangential clearance angle of the tooth flank is variable along the second axis.

* * * * *